United States Patent [19]

Moore

[11] Patent Number: 4,842,317
[45] Date of Patent: Jun. 27, 1989

[54] SIDE RAILS FOR FLAT BED VEHICLES

[75] Inventor: Vernon S. Moore, Ringgold, Ga.

[73] Assignee: Holmes International Inc., Chattanooga, Tenn.

[21] Appl. No.: 214,496

[22] Filed: Jul. 1, 1988

[51] Int. Cl.[4] .............................................. B62D 27/00
[52] U.S. Cl. ...................................... 296/36; 296/13; 296/32; 108/5; 410/94; 105/384
[58] Field of Search .................... 296/13, 14, 32, 36, 296/43; 105/381, 384, 378, 379, 387, 391; 410/94; 312/322; 108/5

[56]  References Cited

U.S. PATENT DOCUMENTS

| 953,509 | 3/1910 | Bird | 296/14 |
|---|---|---|---|
| 3,841,690 | 10/1974 | Piercy | 296/13 X |
| 4,278,284 | 7/1981 | Ohlson | 296/36 |
| 4,343,244 | 8/1982 | Moriarty et al. | 312/322 X |

FOREIGN PATENT DOCUMENTS 2008301  1/1971  Fed. Rep. of Germany ........ 296/36

*Primary Examiner*—Robert B. Reeves
*Assistant Examiner*—John M. Gruber
*Attorney, Agent, or Firm*—Alan Ruderman

[57] ABSTRACT

A flat bed vehicle such as a tilt bed car carrier vehicle has side rails which may be positionable either in a raised position disposed above the bed platform and a lowered stowed position wherein the tops of the rails are disposed coextensive with the platform. The caps or tops of the rails are supported on posts and the ends of posts remote from the caps have cam followers which are positioned within respective cam tracks extending transversely beneath the bed floor. The cam tracks are configured so that the followers may be moved between first and second ends of the cam tracks selectively. At one end of each track the follower is located such that the respective post may be either in the upstanding operative position at the side of the bed, and at the other end of the track the follower is located such that the post is in the stowed position extending transversely beneath the floor of the bed with the cap of the rail positioned on a shelf of a longitudinally extending bracket at the edge of the side. The bracket has openings through which each post extends and permits the rail to be pivoted as the follower is moved along the cam track.

19 Claims, 2 Drawing Sheets

SIDE RAILS FOR FLAT BED VEHICLES

BACKGROUND OF THE INVENTION

This invention relates to side rails for flat bed vehicles and more particularly to side rails for tilt bed car carrier vehicles, the rails being mounted for movement from an upstanding operative position to a stow position coextensive with the bed of the vehicle.

Vehicles having a slidable and tiltable flat bed for transporting cars and the like, such as disabled vehicles, frequently are used for other transporting purposes. For example, because these vehicles have elongated open flat beds they are adaptable for transporting large containers when not functioning for their primary purpose. To provide a curb which precludes side shifting containers from sliding overboard, it is common for such vehicles to incorporate rails extending longitudinally along the sides of the bed. Additionally, the rails provide an extra safety factor when cars are being transported. When these vehicles, generally called slide back vehicles, are being loaded with containers, the containers are loaded onto the bed from a side thereof rather than from the back as in the case of cars. Thus, the rails present an obstacle to the loading of the containers. When a fork lift or similar apparatus is used to load a pallet or container onto the bed, the rails make it awkward for the forks with the pallet or container thereon from being positioned readily onto the bed since the fork must be lifted above the rails. For this reason, it is common to provide such vehicles with rails which are removeably mounted on the bed by means of slots in the bed which receive vertical posts extending from the rail caps. The rails may be removed from the bed when the bed is being loaded nd thereafter replaced by positioning the posts in the slots in the operative position. However, it is not uncommon for such rails to be misplaced when not in use and not to be relocated when needed. For this reason, it is highly desirable to provide a flat bed vehicle such as a slideback vehicle having side rails which may be stowed when not in use in a convenient location and be readily available for use when needed.

SUMMARY OF THE INVENTION

Consequently, it is a primary object of the present invention to provide side rails for flat bed vehicles which rails are readily moveable between an operative position on the side of the bed and an inoperative stowed position supported within or beneath the bed.

It is another object of the present invention to provide side rails for a flat bed vehicle wherein the rails are mounted for movement guided along a cam track between an upstanding operative position to a stowed position.

It is a further object of the present invention to provide on a flat bed vehicle, side rails which may be moved from an operative position upstanding at the side of the bed to a stowed position wherein the rails are lowered to a retracted position so as to be substantially coplanar with the floor of the bed.

It is a still further object of the present invention to provide side rails for a flat bed vehicle wherein the rail caps are supported on posts upstanding from the sides of the bed in the operative position and may be lowered to a retracted stowed postition with the post disposed within the bed beneath the floor thereof and with the rail caps disposed at the sides of the bed, the posts being mounted for movement guided along a cam track within the bed beneath the floor, and the rails being securely mounted in both the operative and the stowed position.

Accordingly, the present invention provides a flat bed vehicle such as a tilt bed car carrier vehicle having side rails which may be positionable either in a raised position disposed above the platform or floor of the bed and a lowered position disposed substantially coextensive with the floor of the bed. The rails are supported at the ends of posts having cam followers disposed within respective cam tracks extending transversely relative to the bed beneath the floor. The cam tracks are configured so that the followers readily move between first and second ends of the track selectively. At one end of each track the follower is located such that the respective post may be disposed in an upstanding operative position at the side of the bed and at the other end of the track the follower is located with the post in the stowed position extending transversely beneath the floor of the bed.

In the preferred form of the invention the sides of the bed have edge members which are stepped downwardly from the floor of the bed, and the rail caps in the stowed position are disposed on the tread or shelf of the step adjacent the riser and substantially forms a continuation of the floor of the bed. Additionally, in the preferred embodiment the rails at each side of the bed are formed in sections and the sections interlock together in both the operative and in the stowed positions. The rails are securely held in both positions by locking means coacting with the rails at each side.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
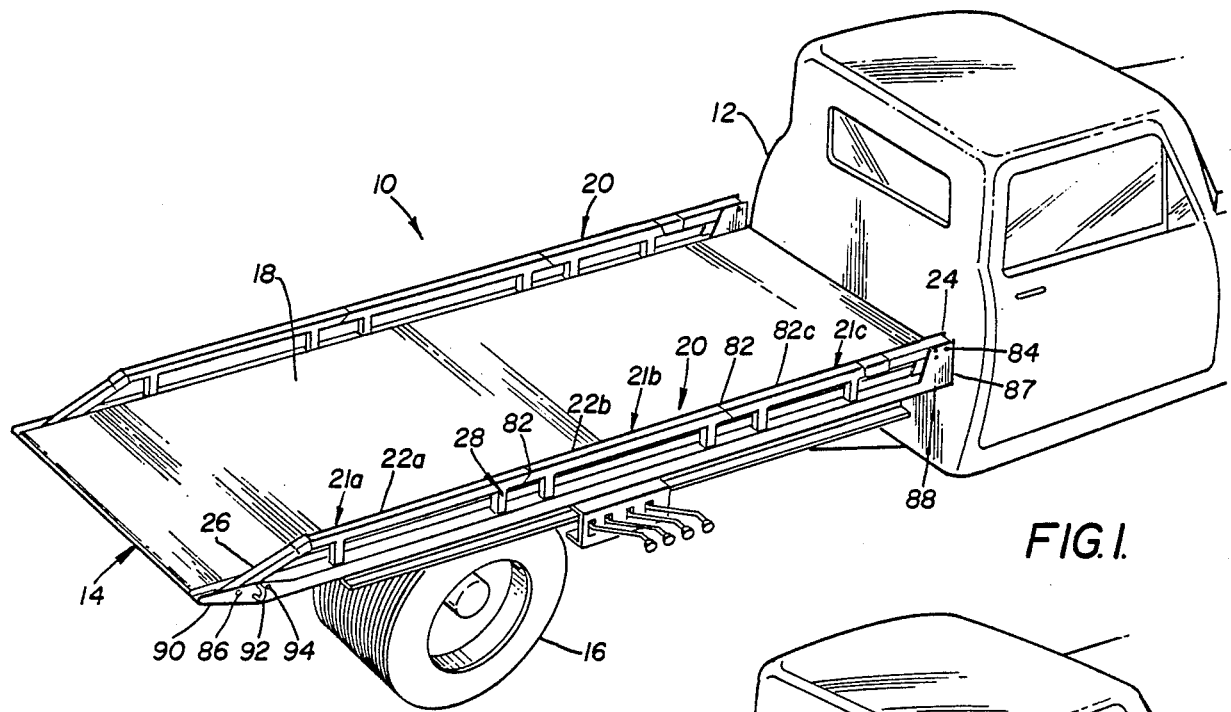
FIG. 1 is a perspective view of a flat bed car carrier vehicle having side rails constructed in accordance with the principles of the present invention, the rails being illustrated in the operative position.

Referring to the drawings, FIG. 1 illustrates a flat bed vehicle such as a disabled car carrier vehicle generally indicated at 10 which conventionally is a truck chassis having a cab 12 at the front thereof and a tiltable and slidable bed 14 extending rearwardly from the cab, the vehicle having at least four wheels, only one of which is illustrated at 16, conventionally disposed in pairs at the front and rear of the vehicle. The bed 14 includes a platform 18 which is supported on and moveable with beams (not illustrated) which are mounted for tilting and sliding relative to the chassis.

The bed 14 includes a pair of side rails generally indicated at 20 spaced one from the other across the width of the platform. The rails 20 at each side of the bed comprise a series of central sections 21 such as sections 21a, 21b, 21c, each having a respective rail cap 22 such as caps 22a, 22b, 22c, the number of such central sections being determined by the length of the bed, and front and rear sections 24, 26. Each central rail sections 21 includes at least one and preferably two post members 28 extending substantially normal to the cap 22 of the rail, while the front and rear sections 24, 26 are merely rail caps without posts.

Figure 3:
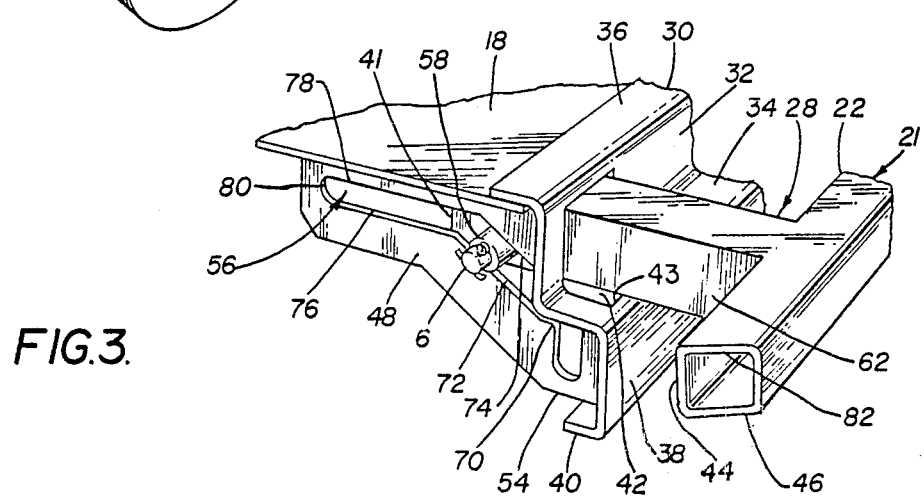
FIG. 3 is a fragmentary perspective view of a portion of one side of the bed of the vehicle of FIG. 1 illustrating a rail partly broken away in a position intermediate the operative and the stowed positions.

Each side edge of the platform 18 preferably includes an elongated bracket member 30, best illustrated in FIG. 3, having a step-like cross sectional configuration including an upstanding substantially vertical riser wall 32 and a substantially horizontal tread or shelf 34 extending substantially normal to the riser wall. The upper edge of the riser wall 32 includes a lip 36 which is fastened to the platform 18 while the outer edge of the shelf 34 preferably includes a downwardly extending wall 38 which visually closes the underside of the platform 18 and portions of the supporting beam. Additionally, the walls 38 may have a lip 40 turned inwardly toward the center-line of the bed and disposed beneath the shelf 34 and may aid in supporting the lower end 41 of the post 28 when in the operative position.

Figure 2:
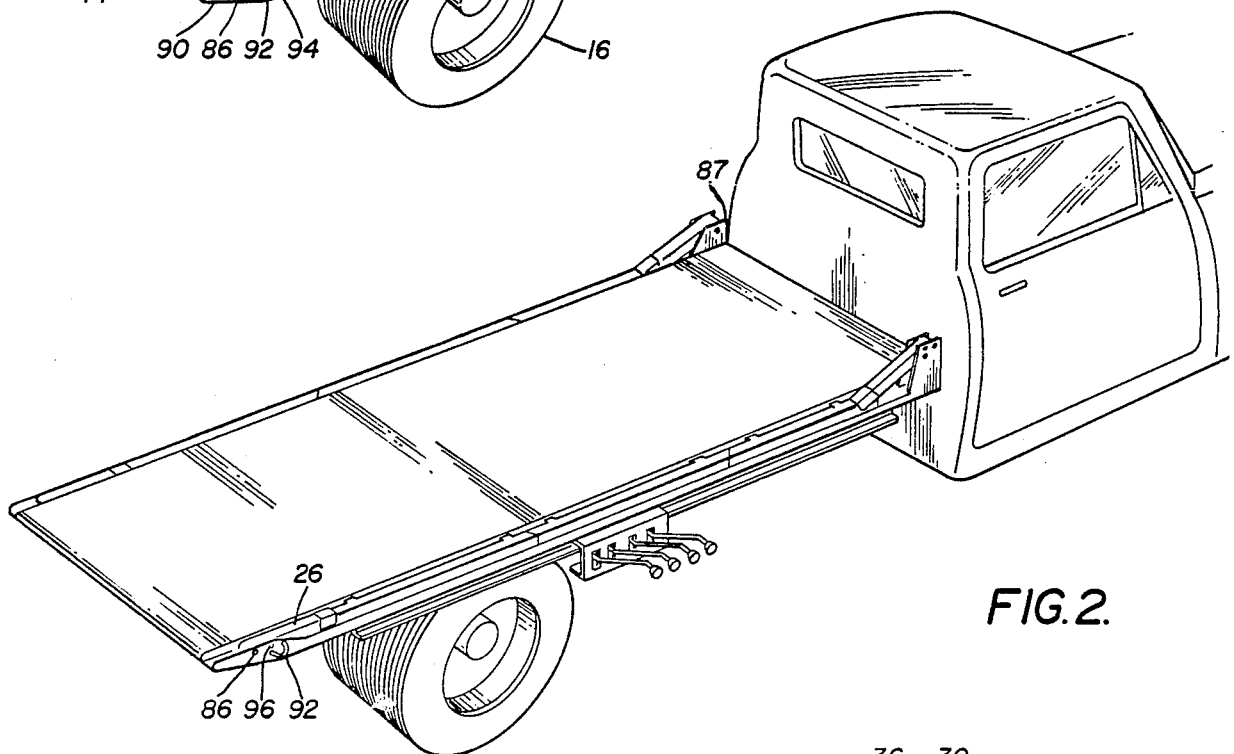
FIG. 2 is a view similar to FIG. 1 with the rails in the lowered or stowed position.

Formed in the member 30 in the riser wall 32 and continuing into the shelf 34 at the location of each post 28 is a cut-out or opening 42, the opening in each of the riser wall 32 and the shelf 34 having a cross sectional shape and area sufficient for receiving the post 28 when disposed substantially normal to the respective wall and shelf, but the opening being continuous between the wall and the shelf so the post may pivot therein between the operative and stowed positions within the opening. Thus, the post 28 may extend upwardly through the portion of the opening in the shelf 34 when the rails are disposed in the operative position as illustrated in FIG. 1, and may extend substantially horizontally through the portion of the opening in the riser wall 32 when the rails are disposed in the stowed position illustrated in FIG. 2, for reasons which will hereinafter become apparent. Preferably the opening 42 terminates in the shelf slightly inwardly of the wall 38 at an edge 43. The cross sectional shape of the step formed by the riser wall 32 and the shelf 34 preferably conforms to at least that of the lower surface 44 and the outer surface 46 respectively of the cap of the rails 20 so that the outer surface 46 of the rail cap may be disposed on the shelf 34 and with the lower surface 44 closely adjacent the riser wall 32 when the rail is in the stowed position, the lower and outer surfaces 44, 46 being defined when the rail is in the operative upstanding disposition.

Positioned under the platform 18 and extending laterally into the confines of the edge brackets 30 at each side of the platform in the vicinity of each post is a cam plate 48. Preferably each cam plate has a top edge 50 welded to the bottom of the platform floor and an outer edge 52 welded to the inner surface of the wall 38. Additionally, to provide further structural integrity, the cam plate 48 may have a configuration such that it has a lower edge 54 disposed on the top surface of at least a portion of the lip 40 and other edges which abut the inner surface of the riser wall 32 and a portion of the lower or interior surface of the shelf 34 so as to be welded thereto to form a rigid integral structure between the platform 18, the edge bracket 30 and the cam plate 48. Formed in each cam plate 48 is a cam track preferably in the form of a slot 56, the slot 56 having a width for receiving a cam follower 58 carried by a respective post 28. Preferably the cam followers 58 are cylindrical rollers or roller bearings which are rotatably journalled on pins 6 secured to the respective post 28 preferably substantially normal to the axis of elongation thereof, and extending from at least either of the longitudinally facing surfaces such as the rearwardly facing surface 62, the follower rollers 58 having a diameter substantially equal to or slightly less than the width of the cam slot 56.

The shape of the cam slot 56 is such that it terminates at a first end in a recess or well 64 aligned with the axis of the follower roller 58 when the post 28 is upstanding so that the follower roller 58 may be received within the well 64 while post 28 and thus the respective rail section cap 22 is in the operative position. The edges of the cam slot extend vertically from the well 64, and while the outer edge 66 may extend upwardly to intersect the lower surface of the shelf 64 which thus forms an edge of the slot, the inner edge 68 extends only to a convex shoulder 70 at a location where the follower 58 will permit the post to be rotated outwardly within the opening 42 without interfering with the bracket 30 when moving from the operative position to the stowed position. From that location the cam slot is inclined upwardly and inwardly as defined by spaced edges 72, 74 so that the follower 58 may be moved within the cam slot to a position defined by substantially horizontally disposed spaced edges 76, 78 defining the remainder of the cam slot and extending inwardly to a remote terminal end 80. When the follower 58 is disposed between the edges 76, 78 of the cam slot, the post 28 is disposed substantially horizontally and may rest on the shelf 34 outwardly of the hole 42. When the follower 58 is disposed at or adjacent the end 58 of the cam slot 56, the rail section cap is disposed on the shelf 34 in the stowed position.

Each rail section 22 may be lowered to the stowed position in seriatim after being unlocked from the operative position. The locking means for securely holding the rails in the upright operative position, and in the stowed position, comprises an interlocking of the ends of the caps of each of the central rail sections together with the front and rear sections 24, 26. This interlocking relationship is attained by providing an angular slope or bevel to the ends of the caps of the central rails, the bevel at the adjoining ends of adjacent sections being oppositely disposed so as to mate and form a continuous rail. Thus, as illustrated in FIG. 3, the end 82 of the rail cap 22 is inclined relatively to the axis of elongation of the cap of the rail, and it can be seen in FIG. 1 that each central section cap 22a, 22b, 22c has such an inclination or bevel at their adjoining ends 82. However, the inclination at the adjoining ends of section caps 22a and 22b are complementary to each other as are the bevels at the adjoining ends of section caps 22b and 22c. The adjoining ends thus abut each other in both the operative position illustrated in FIG. 1 and the stowed position illustrated in FIG. 2. The end of the rail section cap adjoining the rear section cap 26, e.g., rail section cap 22a, and the adjoining end of the rear rail section 26 may also have such an inclined or beveled relationship, as may the end of the front rail section 24 and the adjoining end of the adjacent central rail section cap 22c. However, such angular relationship for the ends of the front and rear sections 24 and 26 are unnecessary where the front and rear sections are themselves inclined in the operative position at that angle as in the preferred embodiment.

Both of the rail sections 24, 26 may be pivotally mounted on respective journal pins 84, 86 between respective bifurcated extensions 88, 90 of the edge bracket 30 or such equivalent members attached to the respective ends of the bed panel 18 and in the preferred embodiment the front section 24 is pivotally mounted on a fixed upright member 87. In either case the front and rear rail sections may pivot up to the operative position and down to the inoperative position, and, by having the ends of the sections which adjoin the respective central rail sections formed without a lower surface, they may overlay the respective adjoining central rail section in the stowed position. One of the front and rear section extension, preferably the rear section extension 90, carries a locking ring 92 in the form of a U-shaped member having one leg rotatably journalled in the extension and biased by a spring or the like (not illustrated) to be drawn inwardly. The same extension, i.e., extension 90 also has a pair of holes 94, 96 into which the other leg of the ring 92 may be inserted selectively. The rear rail 26 also has a pair of holes (not illustrated) in its outer facing surface, one of which is aligned with the hole 94 when the rear rail is in the operative position, and the other of which is aligned with the hole 96 when in the stowed position. Thus, the ring 92 may be rotated selectively to insert its free end into hole 94 and the aligned hole in the rear rail when the rails are in the operative position, and by pulling the ring outwardly against the bias spring the free end may be released from those holes and reinserted into hole 96 and the cooperating aligned hole of the rear rail 26 when in the stowed position. When so disposed in either case, the locking ring secures the rear rail to the extension 90. The interlocking relationship of the rear rail with the adjacent rail cap 22a holds the rail and the other interlocked rails securely when the rails are disposed in either the operative or the stowed position.

Figure 4:
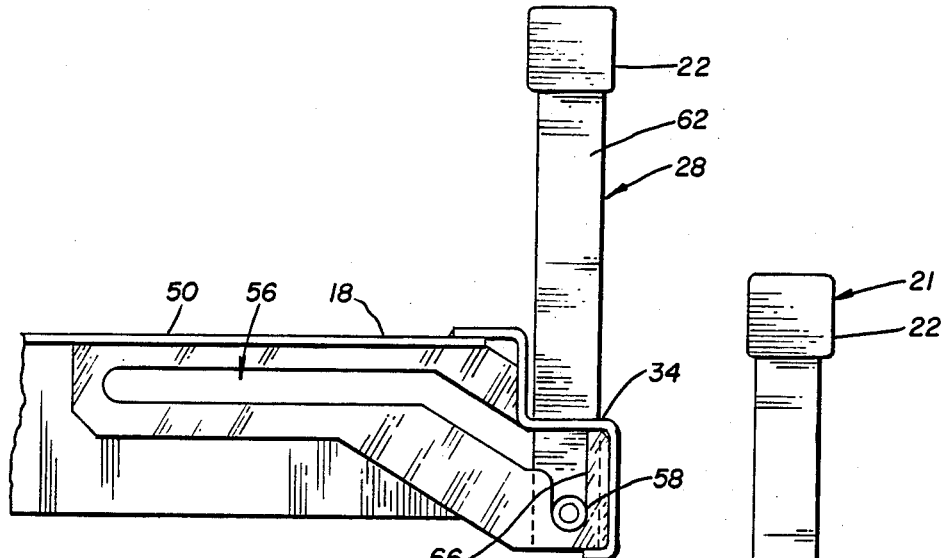
FIGS. 4 through 8 are diagrammatic views illustrating the dispositions of the side rails and the steps involved in positioning the side rails between the operative position illustrated in FIG. 4 and the stowed position illustrated in FIG. 8.

The procedure for lowering the rails from the operative position to the stowed position and vice versa may be clearly understood with reference to FIGS. 4 through 8. In the operative position as illustrated in FIG. 4, the posts 28 associated with each central rail section 21 are disposed in the upright position extending through the opening 42 within the shelf 34 while the rail cap 22 is disposed above the shelf 34 and may be substantially parallel thereto. The follower roller 58 in this operative position is seated within the well 64 of the cam track 56, and the lower edge 41 of each post 28 may rest on the lip 40 of the edge bracket 30.

Figure 5:
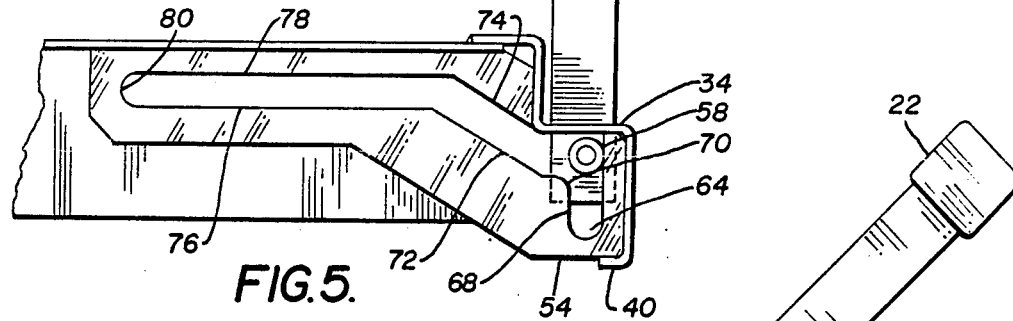
Figure 6:
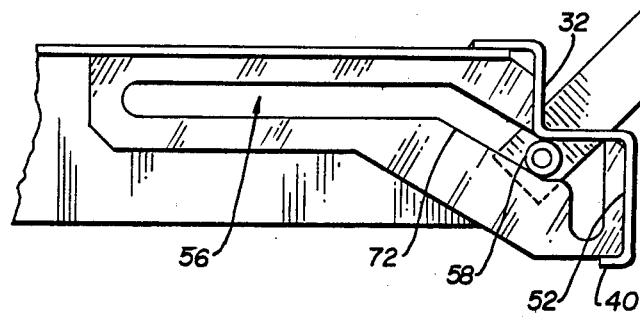
Figure 7:
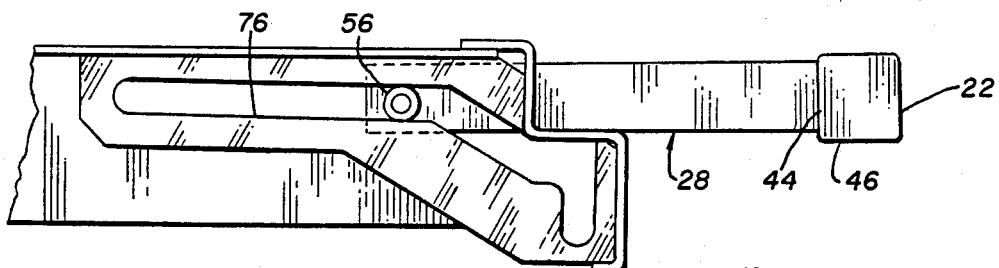
Figure 8:
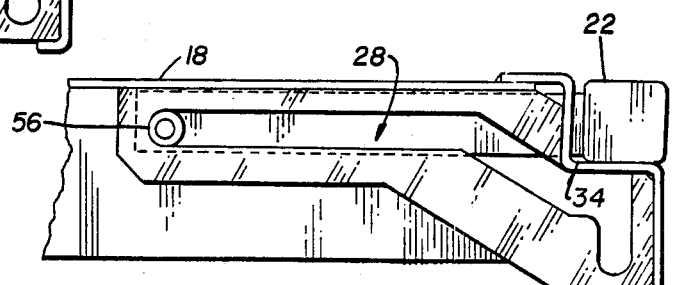

When it is desired to move the rails to the stowed position, the rear rail 26 is first released from its locked position by pulling on the ring and pivoting the rear rail rearwardly to release its interlocking relationship with the adjacent rail cap 22a. The rail 21a may then be moved to the inoperative position merely by initially pulling up on the rail as illustrated in FIG. 5 so that the follower 58 is removed from the well 64 and disposed above the shoulder 70. The rail may now be pivoted as illustrated in FIG. 6 so that the follower is disposed on the edge 72 of the cam track slot 56, the opening 42 permitting the posts to pivot with the edge 43 of the opening 42 acting as a stop. The rail is then pushed inwardly so that the follower roller 58 rolls along the edge 72 until it reaches the edge 76. At this point further inward pushing on the rail results in the roller 56 rolling along the edge 76 as illustrated in FIG. 7, with the post 28 supported on the shelf 34. Further inward pushing on the rail results in the follower roller being driven to the end 80 of the cam track slot 56 and, as illustrated in FIG. 8, at this point the post 28 is disposed beneath the floor of the panel 18 and the cap 22 of the rail section is disposed on the shelf 34 in the stowed position.

Subsequent to the rail section 21a being moved from the operative position to the stowed position, the rail sections 21b and 21c are so moved in seriatim. The front rail section 24 may then be pivoted to the stowed position, and the rear rail section 26 may then be pivoted forwardly to overlie the adjoining central rail section 21a. The locking ring 92 may then be repositioned so that the free end thereof is inserted into the hole 94 and locks the rails in the stowed position. To move the rails from the stowed position to the operative position, the procedure is reversed. The rear rail 26 is first pivoted upwardly, then each of the rails are positioned to the operative position merely by pulling outwardly until the follower roller 56 is disposed in the well 64. After each rail is so positioned the front rail 24 is interlocked with the rail cap 22c, and the rear rail is then interlocked with the adjacent rail cap 22a and the locking ring reinserted into the hole 96.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. For a flat bed vehicle having a bed comprising an elongated platform including front, rear and side edges, and rails disposed at each side edge, said rails comprising a longitudinally extending rail cap and at least one support post extending therefrom, apparatus for selectively positioning each rail between a raised operative position with said post upstanding and said cap disposed above said platform and a lowered stowed position with said post extending transverse to said platform and said cap disposed substantially coextensive with said platform, said apparatus comprising a cam plate having a cam track disposed beneath said platform adjacent said post, cam follower means carried by said post at a location remote from said cap disposed for traveling on said cam track, and said cam track having a configuration for permitting said follower means to be moved from a first location disposed beneath said rail cap when said rail is in the operative position and to be guided to a second location disposed transversely relative to said rail cap when said rail is in the stowed position, whereby said rail may be moved manually from the operative position and guided by said follower means to be moved to said stowed position and may be returned manually to said operative position selectively.

2. Apparatus as recited in claim 1, wherein said cam track is disposed for guiding said follower means for movement in a vertical plane for permitting said post to be moved in a vertical plane.

3. Apparatus as recited in claim 1, wherein said cam track terminates in a well at said first location, said well being disposed for receiving said follower means when said rail is in the operative position.

4. Apparatus as recited in claim 2, wherein each of said rails includes a plurality of rail sections, each of said sections comprising a rail cap and at least one post, each rail cap having a forward and a rearward facing extremity, the forward facing extremity of one rail cap having a surface for abutting and interlocking with the rear facing extremity of a forwardly disposed adjacent rail cap when adjacent sections are both disposed in the operative position and in the stowed position 5. Apparatus as recited in claim 4, including a front and rear rail section at each side of said bed, means for pivotably mounting said front and rear rail sections for movement about a horizontally disposed axis, said front rail section having a rail cap including a rearwardly facing extremity for abutting and interlocking the forward facing extremity of an adjacent rail section in at least said operative position, said rear rail section having a rail cap having a forward facing extremity for abutting and interlocking with an adjacent rail section in at least said operative position, and means for locking at least one of said front and rear rail sections to said bed in both the operative and stowed positions to secure all the rail sections in the selected position.

6. Apparatus as recited in claim 2, wherein each side edge includes means defining an opening for receiving said post and permitting said post to pivot from said operative position to said stowed position.

7. Apparatus as recited in claim 6, wherein said means defining an opening comprises a longitudinally elongated bracket disposed on each side edge, said bracket having a transverse cross sectional configuration including a step defined by a riser wall depending downwardly from said platform and terminating at a shelf, said shelf extending transversely outwardly from the riser wall away from said platform, said opening being formed in said riser wall and in said shelf.

8. Apparatus as recited in claim 7, wherein said cam track terminates in a well at said first location, said well being disposed beneath said shelf.

9. Apparatus as recited in claim 8, wherein said shelf is disposed for supporting said rail cap when said rail is in the stowed position.

10. Apparatus as recited in claim 7, wherein said opening terminates in said shelf at an edge spaced inwardly from the outer extremity of said shelf, said edge defining a stop for limiting the pivoting of said post.

11. Apparatus as recited in claim 2, wherein said cam track includes an intermediate portion inclined relatively to said platform, said intermediate portion being intermediate said first and second locations for permitting said post to pivot when said follower means is disposed thereon.

12. Apparatus as recited in claim 11, wherein said track terminates at a well at said first location, said track including a convex shoulder at the end of said intermediate portion adjacent said first location remote from said second location, said shoulder being disposed vertically above said well.

13. Apparatus as recited in claim 12, wherein each of said rails includes a plurality of rail sections, each of said sections comprising a rail cap and at least one post, each rail cap having a forward and a rearward facing extremity, the forward facing extremity of one rail cap having a surface for abutting and interlocking with the rear facing extremity of a forwardly disposed adjacent rail cap when adjacent sections are both disposed in the operative position and in the stowed position.

14. Apparatus as recited in claim 13, including a front and rear rail section at each side of said bed, means for pivotably mounting said front and rear rail sections for movement about a horizontally disposed axis, said front rail section having a rail cap including a rearwardly facing extremity for abutting and interlocking the forward facing extremity of an adjacent rail section in at least said operative position, said rear rail section having a rail cap having a forward facing extremity for abutting and interlocking with an adjacent rail section in at least said operative position, and means for locking at least one of said front and rear rail sections to said bed in both the operative and stowed positions to secure all the rail sections in the selected position.

15. Apparatus as recited in claim 12, wherein each side edge includes a longitudinally elongated bracket disposed at each side edge, means defining an opening in said bracket for receiving said post and permitting said post to pivot in said vertical plane from said operative position to said stowed position, said bracket having a transverse cross sectional configuration including a step defined by a riser wall depending downwardly from said platform and terminating at a shelf, said shelf extending transversely outwardly from the riser wall away from said platform, said opening being formed in said riser wall and in said shelf.

16. Apparatus as recited in claim 15, wherein said shelf is disposed for supporting said rail cap when said rail is in the stowed position.

17. Apparatus as recited in claim 15, wherein said opening terminates in said shelf at an edge spaced inwardly from the outer extremity of said shelf, said edge defining a stop for limiting the pivoting of said post.

18. Apparatus as recited in claim 17, wherein each of said rails includes a plurality of rail sections, each of said sections comprising a rail cap and at least one post, each rail cap having a forward and a rearward facing extremity, the forward facing extremity of one rail cap having a surface for abutting and interlocking with the rear facing extremity of a forwardly disposed adjacent rail cap when adjacent sections are both disposed in the operative position and in the stowed position 19. Apparatus as recited in claim 18, including a front and rear rail section at each side of said bed, means for pivotably mounting said front and rear rail sections for movement about a horizontally disposed axis, said front rail section having a rail cap including a rearwardly facing extremity for abutting and interlocking the forward facing extremity of an adjacent rail section in at least said operative position, said rear rail section having a rail cap having a forward facing extremity for abutting and interlocking with an adjacent rail section in at least said operative position, and means for locking at least one of said front and rear rail sections to said bed in both the operative and stowed positions to secure all the rail sections in the selected position.

* * * * *